(12) United States Patent
Seo et al.

(10) Patent No.: US 11,312,369 B2
(45) Date of Patent: Apr. 26, 2022

(54) APPARATUS FOR CONTROLLING PARKING OF A VEHICLE, SYSTEM HAVING THE SAME AND METHOD FOR THE SAME

(71) Applicants: HYUNDAI MOTOR COMPANY, Seoul (KR); KIA MOTORS CORPORATION, Seoul (KR)

(72) Inventors: Gil Won Seo, Hwaseong-si (KR); Su Min Choi, Hwaseong-si (KR); Ki Ho Lee, Yongin-si (KR); Jin Ho Park, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 205 days.

(21) Appl. No.: 16/785,129

(22) Filed: Feb. 7, 2020

(65) Prior Publication Data
US 2021/0039633 A1  Feb. 11, 2021

(30) Foreign Application Priority Data

Aug. 9, 2019 (KR) .......................... 10-2019-0097722

(51) Int. Cl.
*B60W 30/06* (2006.01)
*B62D 15/02* (2006.01)
(Continued)

(52) U.S. Cl.
CPC ............ *B60W 30/06* (2013.01); *B60W 10/04* (2013.01); *B60W 10/20* (2013.01);
(Continued)

(58) Field of Classification Search
CPC ...... B60W 30/06; B60W 10/20; B60W 10/04; B60W 2720/24; B60W 2720/10; B60W 30/181; B60W 40/02; B60W 40/10; B60W 2520/04; B60W 2520/10; B60W 2530/18; B62D 15/0285; B62D 15/021; G05D 1/0088; G05D 1/0212; G05D 2201/0213; B60Y 2300/06; B60Y 2300/18091
(Continued)

(56) References Cited

U.S. PATENT DOCUMENTS

2009/0085771 A1* 4/2009 Wu ..................... B62D 15/0285
348/148
2009/0243889 A1* 10/2009 Suhr ..................... G08G 1/168
340/932.2
(Continued)

*Primary Examiner* — Jonathan M Dager
*Assistant Examiner* — Jean W Charleston
(74) *Attorney, Agent, or Firm* — Morgan, Lewis & Bockius LLP

(57) ABSTRACT

An apparatus for controlling parking of a vehicle, a system having the same, and a method for the same are provided. The apparatus for controlling parking of a vehicle includes a processor to stop the vehicle when the vehicle arrives at a target parking space while performing an automatic parking of the vehicle to the target parking space, to adjust a steering angle, and to terminate the automatic parking after moving the vehicle for a predetermined distance when the steering angle is adjusted and the steering angle is greater than a preset threshold angle and a storage to store a parking path and the threshold angle.

12 Claims, 13 Drawing Sheets

(51) Int. Cl.
*B60W 10/20* (2006.01)
*B60W 10/04* (2006.01)

(52) U.S. Cl.
CPC ..... *B62D 15/0285* (2013.01); *B60W 2720/10* (2013.01); *B60W 2720/24* (2013.01)

(58) Field of Classification Search
USPC .......................................................... 701/25
See application file for complete search history.

(56) References Cited

U.S. PATENT DOCUMENTS

| | | | |
|---|---|---|---|
| 2010/0211267 A1* | 8/2010 | Shimazaki | G08G 1/168 340/932.2 |
| 2013/0166190 A1* | 6/2013 | Ikeda | B62D 15/0285 701/400 |
| 2016/0200317 A1* | 7/2016 | Danzl | B60W 10/04 701/25 |
| 2018/0162384 A1* | 6/2018 | Kim | B62D 15/0285 |
| 2018/0354502 A1* | 12/2018 | Yaldo | B60W 30/06 |
| 2019/0101925 A1* | 4/2019 | Simmons | G05D 1/0088 |
| 2020/0079361 A1* | 3/2020 | Suzuki | G05D 1/0033 |

* cited by examiner

1) STEERING CONTROL TO FOLLOW PARKING PATH

2) STEERING CONTROL TO ARRIVE AT TARGET POSITION

3) STEERING ALIGNMENT CONTROL IN STOP STATE

4) REARWARD-MOVEMENT AND FORWARD-MOVEMENT REPEATED

5) STOP AND COMPLETION
(TIRE AND STEERING WHEEL ALIGNED)

APPARATUS FOR CONTROLLING PARKING OF A VEHICLE, SYSTEM HAVING THE SAME AND METHOD FOR THE SAME

CROSS-REFERENCE TO RELATED APPLICATION

The present application claims priority to and the benefit of Korean Patent Application No. 10-2019-0097722, filed on Aug. 9, 2019, which is incorporated herein by reference in its entirety.

TECHNICAL FIELD

The present disclosure relates to an apparatus for controlling parking of a vehicle, a system having the same, and a method for the same, and more particularly relates to a technology in which a tire and a steering wheel are positioned at the center in automatic parking control.

BACKGROUND

The statements in this section merely provide background information related to the present disclosure and may not constitute prior art.

In a vehicle system, Remote Smart Parking Assist (RSPA), which is one of driver supporting services, provides a convenient function to a driver by automatically providing the steering, the braking, the driving, and the gear shifting of the vehicle in the state that a driver gets on or off the vehicle when the vehicle parks or departs. The RSPA determines whether parking is completed by using a distance and an angle based on alignment with surrounding vehicles under a perpendicular or parallel parking situation.

SUMMARY

An aspect of the present disclosure provides an apparatus for controlling the parking of a vehicle, a system having the same, and a method for the same, capable of preventing a tire and a steering angle from being misaligned due to the reaction of a road surface while controlling the alignment of the tire and a steering wheel such that the tire and the steering wheel are positioned at the center when an automatic parking control is terminated.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling parking of a vehicle may include a processor to perform stop control when performing automatic parking control into a target parking space and when the vehicle arrives at the target parking space, to perform steering angle alignment control, and to terminate the automatic parking control after moving the vehicle to a preset specific distance or more in a state that the steering angle alignment control is completed when a steering angle is greater than a preset threshold angle; and a storage to store the parking path and the threshold angle.

In some forms of the present disclosure, the processor may search for at least one parking space, when entering an automatic parking control mode, select, as the target parking space, one of the at least one parking space, and control the vehicle to follow a parking path at a target vehicle speed such that the vehicle is parked in the target parking space.

In some forms of the present disclosure, the processor may terminate the automatic parking control after performing the steering angle alignment control, when the steering angle is equal to or less than the preset threshold angle.

In some forms of the present disclosure, the processor may determine that the vehicle arrives at the target parking space when the vehicle is positioned within a range obtained by subtracting an allowable position error from a target parking position.

In some forms of the present disclosure, the processor may terminate the automatic parking control when a movement distance of the vehicle is equal to or greater than a preset threshold distance by repeatedly moving the vehicle forward or rearward in the state that the steering angle alignment control is completed when the steering angle is greater than the preset threshold angle.

In some forms of the present disclosure, a vehicle system may include a sensing device to sense at least one parking space, and a parking control device to perform stop control when performing automatic parking control into a target parking space, which is selected the at least one parking space, and when a vehicle arrives at the target parking space, to perform steering angle alignment control, and to terminate the automatic parking control after moving the vehicle to a preset specific distance or more in a state that a steering angle alignment control is completed when the steering angle is greater than a preset threshold angle.

In some forms of the present disclosure, the parking control device may search for at least one parking space, when entering an automatic parking control mode, selects, as the target parking space, one of the at least one parking space, and controls the vehicle to follow a parking path at a target vehicle speed such that the vehicle is parked in the target parking space.

In some forms of the present disclosure, the parking control device may terminate the automatic parking control after performing the steering angle alignment control, when the steering angle is equal to or less than the preset threshold angle.

In some forms of the present disclosure, the parking control device may determine that the vehicle arrives at the target parking space when the vehicle is positioned within a range obtained by subtracting an allowable position error from a target parking position.

In some forms of the present disclosure, a method for controlling parking of a vehicle may include performing stop control, when performing automatic parking control into a target parking space, and when the vehicle arrives at the target parking space, performing steering angle alignment control; and terminating the automatic parking control after moving the vehicle to a preset specific distance or more in a state that the steering angle alignment control is completed when a steering angle is greater than a preset threshold angle.

In some forms of the present disclosure, the performing of the stop control may include searching for at least one parking space, when entering an automatic parking control mode, selecting, as the target parking space, one of the at least one parking space, and controlling the vehicle to follow a parking path at a target vehicle speed such that the vehicle is parked in the target parking space.

In some forms of the present disclosure, the method may further include terminating the automatic parking control after performing the steering angle alignment control, when the steering angle is equal to or less than the preset threshold angle.

In some forms of the present disclosure, the terminating of the automatic parking control after moving the vehicle may include terminating the automatic parking control when a movement distance of the vehicle, which suffers the steering angle alignment control, is equal to or greater than the preset threshold distance, by repeatedly moving the vehicle forward or rearward in the state that the steering angle alignment control is completed when the steering angle is greater than the preset threshold angle.

In some forms of the present disclosure, the performing of the stop control may include determining that the vehicle arrives at the target parking space when the vehicle is positioned within a range obtained by subtracting an allowable position error from a target parking position.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
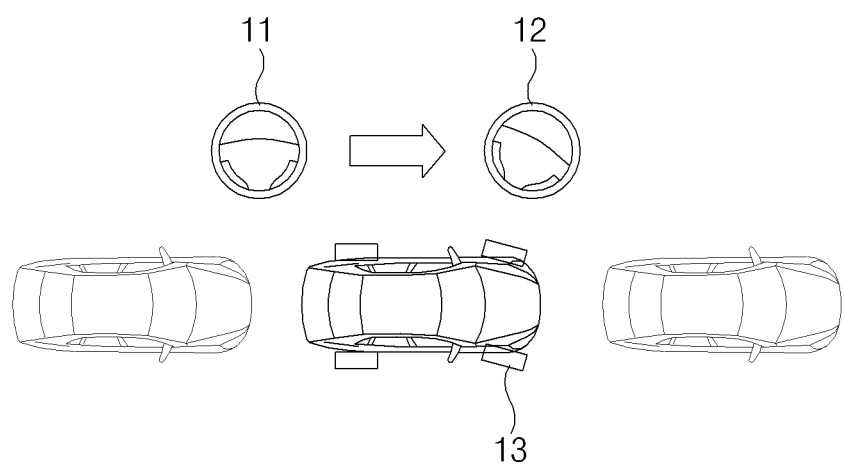
FIG. 1 is a view showing an alignment example of a steering wheel and a tire during parking control according to a well-known technology.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In describing the components of some forms of the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure may be applied to an RSPA technology.

When a condition to determine the completion of the parking is satisfied, the steering wheel is controlled to the center to align the tire and then the system is terminated. However, if the system is terminated after only the steering wheel is aligned to the center in the situation that the tire is misaligned in the stop state of the vehicle, the tire and the steering wheel may partially return in the existing direction due to the reaction of a road surface at the time point that the steering control is released. FIG. 1 is a view showing an alignment example of a steering wheel and a tire during parking control according to a well-known technology. Referring to FIG. 1, it may be recognized that a steering wheel in a state 11 is misaligned as in a state 12, and even a tire 13 is misaligned after the parking is completed.

Figure 2:
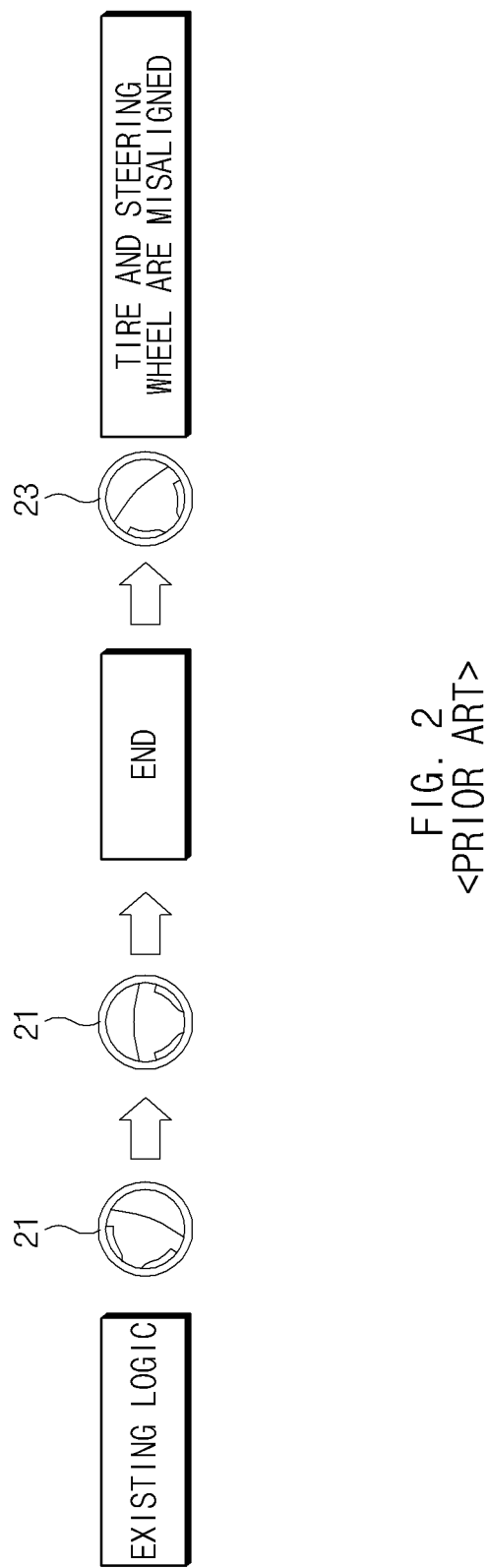
FIG. 2 is a view illustrating the procedure of controlling parking according to a prior art.

As illustrated in FIG. 2, conventionally, when the parking is performed by changing the direction of the steering wheel 21 through a parking control logic and the steering wheel is misaligned in the state that the vehicle is stopped, the parking control is terminated after the steering wheel is controlled to be aligned to the center. However, the steering wheel 23 and the tire are not aligned due to the reaction of the road surface. Accordingly, when the driver departs in the state of failing to recognize the steering wheel and tire misaligned, after starting, an accident may be caused. In addition, after the parking, a user feels like the tire and steering wheel misaligned, so the user may recognize as having an incomplete function, thereby lowering marketability.

Hereinafter, some forms of the present disclosure will be described with reference to FIGS. 3 to 8.

Figure 3:
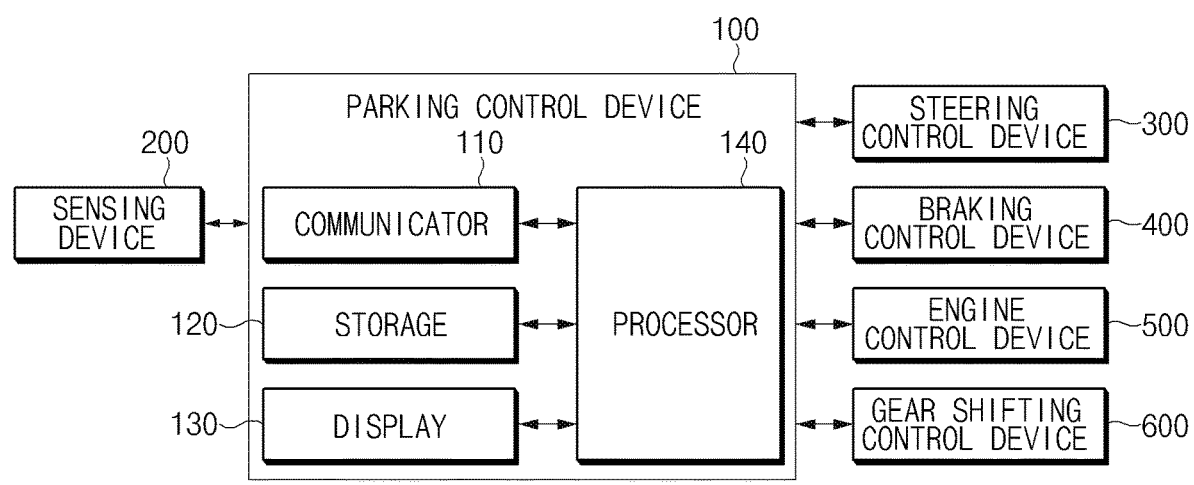
FIG. 3 is a block diagram illustrating components of a vehicle system including an apparatus for controlling the parking of the vehicle in one form of the present disclosure.

FIG. 3 is a block diagram illustrating components of a vehicle system including an apparatus for controlling the parking of the vehicle (hereinafter, referred to as "a parking control device") in some forms of the present disclosure.

Referring to FIG. 3, in some forms of the present disclosure, the vehicle system may include a parking control device 100, a sensing device 200, a steering control device 300, a braking control device 400, and an engine control device 500.

The parking control device 100, which serves as an RSPA, may control driving/gear shifting/braking devices in response to a request of a driver under parking or departing situation in the state that the driver gets on/gets off the vehicle.

The parking control device 100 may perform stop control when performing automatic parking control into a target parking space and when the vehicle arrives at the target parking space, may perform steering angle alignment control, and may terminate the automatic parking control after moving the vehicle to a preset specific distance or more in a state that the steering angle alignment control is completed when the steering angle is greater than a preset threshold angle.

The parking control device 100 may include a communicator 110, a storage 120, a display 130, and a processor 140.

The communication device 110 is a hardware device implemented with various electronic circuits to transmit and receive a signal through wireless or wired connection. According to the present disclosure, the communication device 110 may make in-vehicle communication through controller area network (CAN) communication or local interconnect network (LIN) communication, or Ethernet communication and may communicate with the sensing device 200, the steering control device 300, the braking control device 400, and the engine control device 500.

The storage 120 may store a sensing result obtained by the sensing device 200, and parking space information, automatic parking path information, a threshold angle, and a threshold distance, which are obtained by the processor 140. The storage 120 may be implemented with at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, and an optical disk-type memory.

The storage 130 may display a parking path, the parking space information, which is found, or a parking state (e.g., an alignment state). The display 130 may be implemented with a head up display (HUD), a cluster, an audio video navigation (AVN), or the like. In addition, the display 130 may include at least one of a liquid crystal display (LCD), a thin film transistor-liquid crystal display (TFT LCD), a light emitting diode (LED) display, an organic light-emitting diode (OLED) display, an active matrix OLED (AMOLED) display, a flexible display, a bended display, and a third dimension (3D) display. Among them, some displays may be implemented with transparent displays configured in a transparent type or a translucence type such that the displays are viewed from the outside. In addition, the display 130 is implemented with a touchscreen including a touch panel to be used as an input device in addition to an output device.

The processor 140 may be electrically connected with the communicator 110, the storage 120, the display 130, and the like, may electrically control each component, and may be an electric circuit that executes software commands. Accordingly, the processor 140 may perform various data processing and calculation to be described below.

The process 140 may perform stop control when performing automatic parking control into a target parking space and when the vehicle arrives at the target parking space, may perform steering angle alignment control, and may terminate the automatic parking control after moving the vehicle to a preset specific distance or more in a state that the steering angle alignment control is completed when the steering angle is greater than a preset threshold angle.

The processor 140 may search for at least one parking space, when entering an automatic parking control mode, select, as the target parking space, one of the at least one parking space, and control the vehicle to follow a parking path at a target vehicle speed such that the vehicle is parked in the target parking space.

The processor 140 may terminate the automatic parking control after performing the steering angle alignment control, when the steering angle is equal to or less than the preset threshold angle.

The processor 140 may determine that the vehicle arrives at the target parking space when the vehicle is positioned within a range obtained by subtracting an allowable position error from a target parking position.

The processor 140 may terminate the automatic parking control when a movement distance of the vehicle is equal to or greater than a preset threshold distance by repeatedly moving the vehicle forward or rearward in the state that the steering angle alignment control is completed when the steering angle is greater than the preset threshold angle.

As described above, according to the present disclosure, the steering angle alignment control is performed such that the tire and the steering wheel of the vehicle are aligned at the center in the automatic parking control mode. In this case, the size of the steering angle is determined, and when the misaligned the steering angle is equal to or greater than the threshold angle, the vehicle is moved by a preset threshold distance in the state that the steering angle alignment control is completed, thereby preventing the steering angle from being misaligned due to a road surface thereafter.

The sensing device 200 may include a plurality of sensors to sense an external object of the vehicle and may obtain the position of the external object, the speed of the external object, the movement direction and/or the type (e.g., a vehicle, a pedestrian, a bicycle, or a motorcycle) of the external object. To this end, the sensing device 200 200 may include a camera, an ultrasonic sensor, a radar, a camera, a laser scanner and/or a corner radar, a LiDAR, an acceleration sensor, a yaw rate sensor, a torque measurement sensor and/or a wheel speed sensor, a steering angle sensor, or the like. According to the present disclosure, the parking space may be searched using the ultrasonic sensor, whether there is present a vehicle in front of or in back of the target parking space may be determined using the camera, and the present position of the vehicle may be estimated to generate a parking path using the wheel speed sensor, the steering angle sensor, and the ultrasonic sensor. In addition, information on the position of the target parking space and the size of the target parking space may be obtained through the sensing device 200.

The steering control device 300 may be configured to control the steering angle of the vehicle, and may include a steering wheel, an actuator operating together with the steering wheel, and a controller to control the actuator. The steering control device 300 may be implemented with Motor Driven Power Steering (MDPS) and may perform target steering angle following control in response to the request of the parking control device 100.

The braking controller 400 may be configured to control the braking of the vehicle, and may include a controller to control a brake. The braking control device 400 may be implemented with Electronic Stability Control (ESC) and may perform target vehicle speed following control, deceleration control, and stop control in response to the request of the parking control device 100.

The engine control device 500 may be configured to control engine driving of the vehicle and may include a controller to control the speed of the vehicle. The engine control device 500, which is an Engine Management System (EMS), may perform target driving torque control in the request of the parking control device 100.

The gear shifting control device 600 may be configured to control the gear shifting of a vehicle, may be implemented with a Shift by Wire Control Unit (SCU), and may perform target gearshift stages (P/R/N/D) in response to the request of the parking control device 100.

Figure 4:
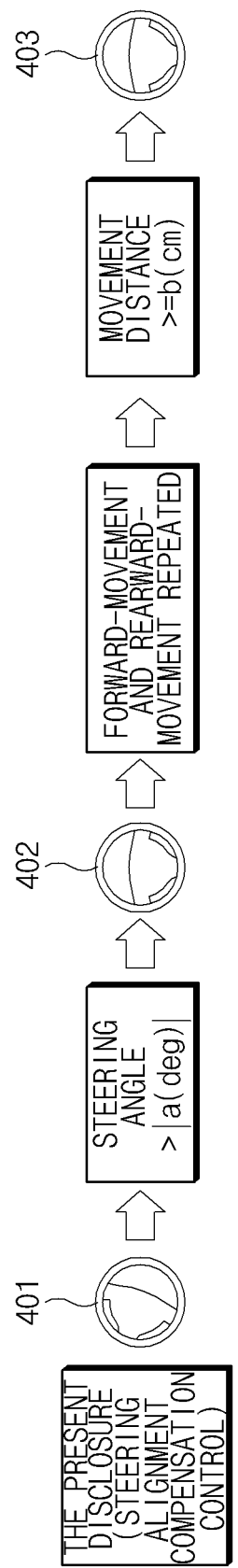
FIG. 4 is a view illustrating a procedure for controlling parking in one form of the present disclosure.

FIG. 4 is a view illustrating a procedure for controlling parking in some forms of the present disclosure. Referring to FIG. 4, according to the present disclosure, the parking control device 100 performs steering control to follow a parking path into the target parking space after searching for a parking space, performs steering control to allow the vehicle to arrive at a target parking position (target parking space), controls steering angle alignment in the state that the vehicle is stopped when the vehicle enters the target parking space, controls the vehicle to repeatedly move forward or backward such that the vehicle arrives at the target parking position, aligns the tire and the steering wheel in the stop state, and completes the parking.

Figure 5A:
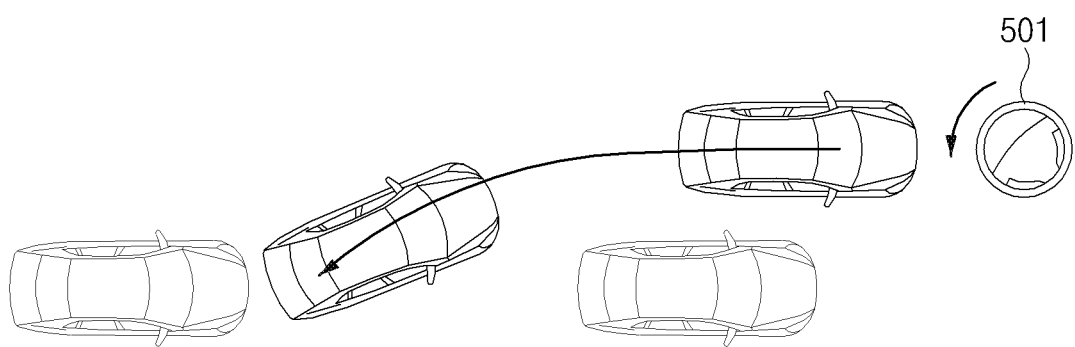
FIG. 5A is a view illustrating steering control for following a parking path, according to an form of the present disclosure.

FIG. 5A is a view illustrating steering control for following a parking path in some forms of the present disclosure. Referring to FIG. 5A, according to the disclosure, the parking control device 100 performs steering control and vehicle speed control to search for a parking space, to generate a target parking path for parking the vehicle into the selected target parking space, and to follow the target parking path. In other words, the parking control device 100 performs a control operation such that the vehicle enters the target parking space.

Figure 5B:
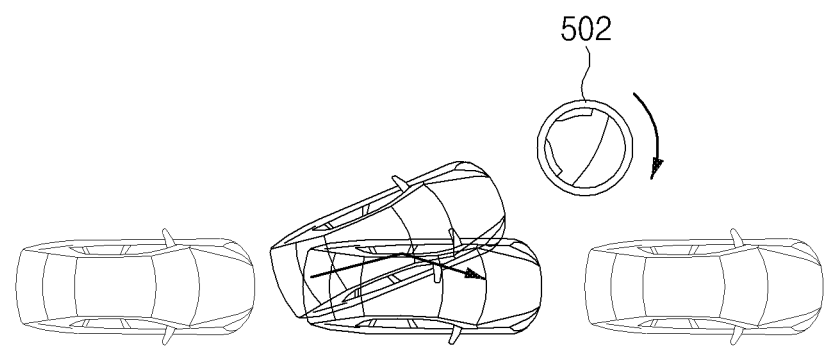
FIG. 5B is a view illustrating steering control such that a vehicle arrives at the target parking position in one form of the present disclosure.

FIG. 5B is a view illustrating the steering control such that the vehicle arrives at the target parking position in some forms of the present disclosure. Referring to FIG. 5B, according to the present disclosure, the parking control device 100 performs the steering control such that the vehicle arrives at the target parking position in the target parking space. The parking control device 100 controls the steering to park the vehicle such that the vehicle is fitted in the target parking space, when the vehicle enters the target parking space.

Figure 5C:
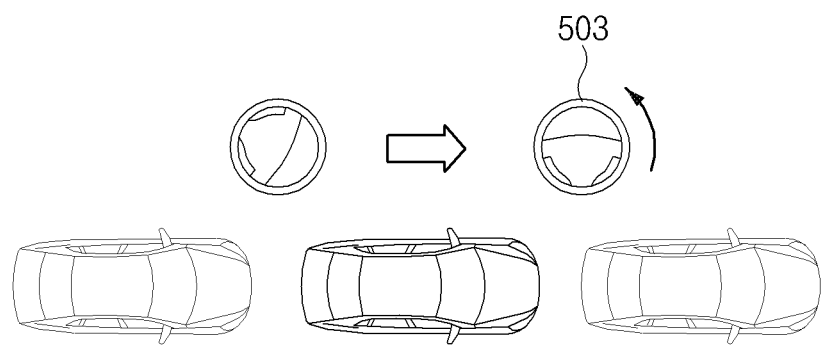
FIG. 5C is a view steering angle alignment control in the stop state of a vehicle in one form of the present disclosure.

FIG. 5C is a view steering angle alignment control in the stop state of the vehicle, in some forms of the present disclosure. Referring to FIG. 5C, according to the present disclosure, the parking control device 100 performs steering center alignment control when the steering angle is equal to or greater than a threshold angle after the vehicle arrives in the target parking space. In this case, when the tire is turned at a specific angle or more in the stop state and aligned at the center, by using the steering wheel, the torsion torque between the road surface and the steering wheel is generated, and measured using a torque sensor of a steering device. When the torsion torque is out of a specific range, and the steering wheel is released, the tire is turned back due to the torsion torque. Accordingly, since the relationship between the torque and the steering angle is varied depending on the weight and the characteristic of the tire, the relationship between the torque and the steering angle may be experimentally measured and the threshold angle (a deg) may be set.

Figure 5D:
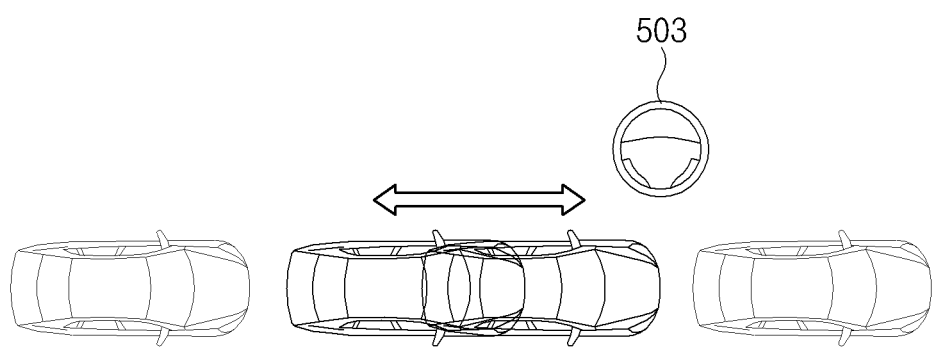
FIG. 5D is a view illustrating an operation of repeatedly controlling a vehicle to move forward and rearward in one form of the present disclosure.

FIG. 5D is a view illustrating an operation of repeatedly controlling the vehicle to move forward and reward, in some forms of the present disclosure. Referring to FIG. 5D, according to the present disclosure, the parking control device 100 moves the vehicle to the threshold distance or more by moving the vehicle forward and rearward within the target parking space.

Figure 5E:
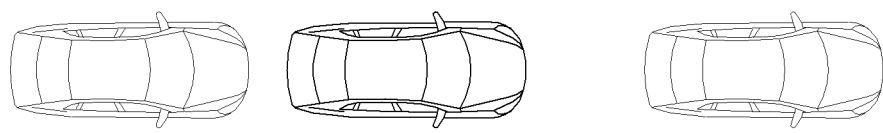
FIG. 5E is a view illustrating an operation of controlling a movement distance in one form of the present disclosure.

FIG. 5E is a view illustrating an operation of controlling a movement distance, in some forms of the present disclosure. FIG. 5E illustrates that the parking control device 100 moves the vehicle to the threshold distance (b cm) or more within the target parking space.

The situation that the vehicle arrives at the target parking position with the misaligned steering angle may mainly occur in a narrow space, that is, the minimum parking space. For example, in parallel parking, if the size of the minimum parking space is a value obtained by adding 80 cm to the full width of the subject vehicle, the front or rear warding minimum distance is 30 cm, the vehicle is able to move about 10 cm forward and backward from the center.

After moving, the vehicle has to be return to complete the parking at the target parking space (e.g., the center). Accordingly, it may be regarded that the steering of the vehicle is maintained to be aligned if the minimum distance of 20 cm is ensured.

Figure 5F:
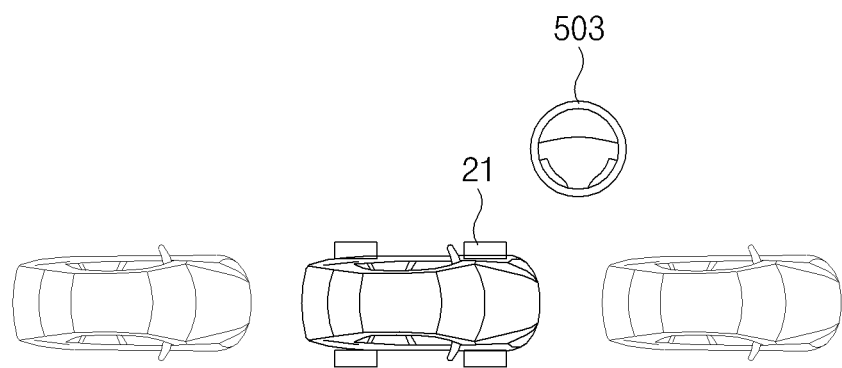
FIG. 5F is a view illustrating that the stop and the parking of a vehicle is completed in one form of the present disclosure.

FIG. 5F is a view illustrating that the parking and the stop of the vehicle are completed, in some forms of the present disclosure. Referring to FIG. 5F, according to the present disclosure, the parking control device 100 terminates parking control when the vehicle is parked at the target parking position. In this case, in FIG. 5C, when the entire portion of the vehicle enters into the target parking space, the steering angle alignment control is performed in the stop state, and then forward-movement and rearward-movement are repeated, so the steering angle alignment state is continuously maintained when the steering control is completed and released Accordingly, it may be recognized that the tire and the steering wheel are automatically aligned after parking is completed.

Figure 6:
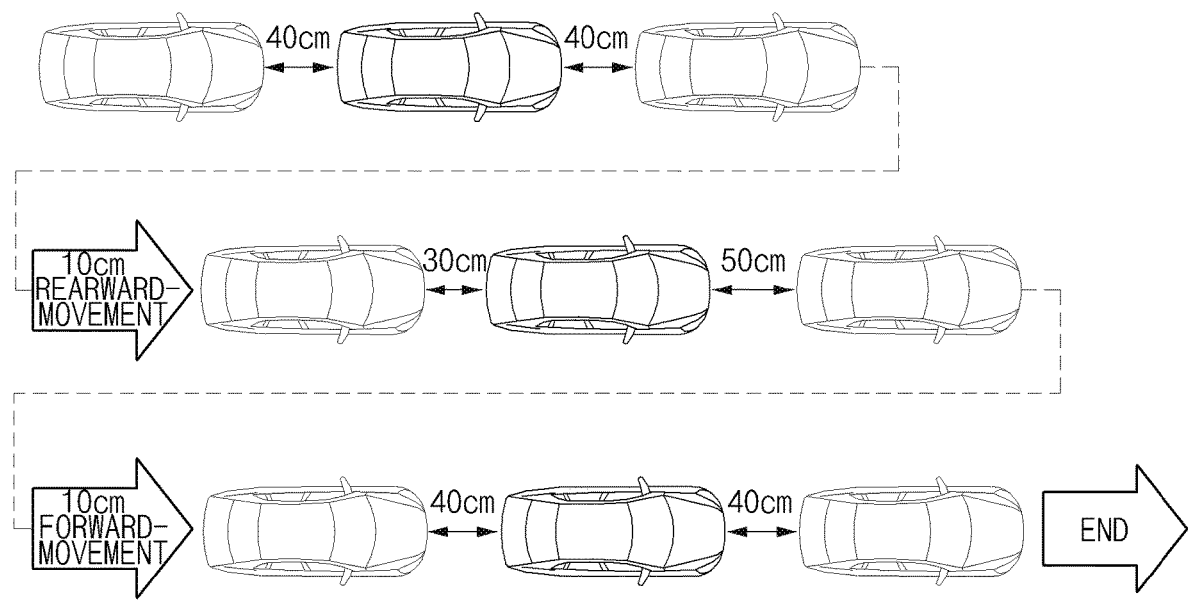
FIG. 6 is a view illustrating the procedure of controlling a distance between vehicles when parking is controlled in one form of the present disclosure.

FIG. 6 is a view illustrating the procedure of controlling a distance between vehicles when parking is controlled, in some forms of the present disclosure.

Referring to FIG. 6, when the steering angle is greater than the threshold angle after the vehicle arrives in the target parking space, the steering angle alignment control is performed and then moved by a specific distance, so as to prevent the tire from being misaligned due to the torsion torque between the road surface and the steering wheel. In other words, referring to FIG. 6, when each of the distances to the front vehicle and the rear vehicle is 40 cm after the vehicle arrives in the target parking space, the forward-movement by 10 cm and the rearward-movement by 10 cm are repeated. Accordingly, when the movement distance is equal to or greater than the threshold distance after the steering angle alignment control of the vehicle, the repetition of the forward-movement and the rearward-movement is stopped, the vehicle is controlled to be positioned at the center of the target parking spaced, and then the parking control is terminated.

Figure 7:
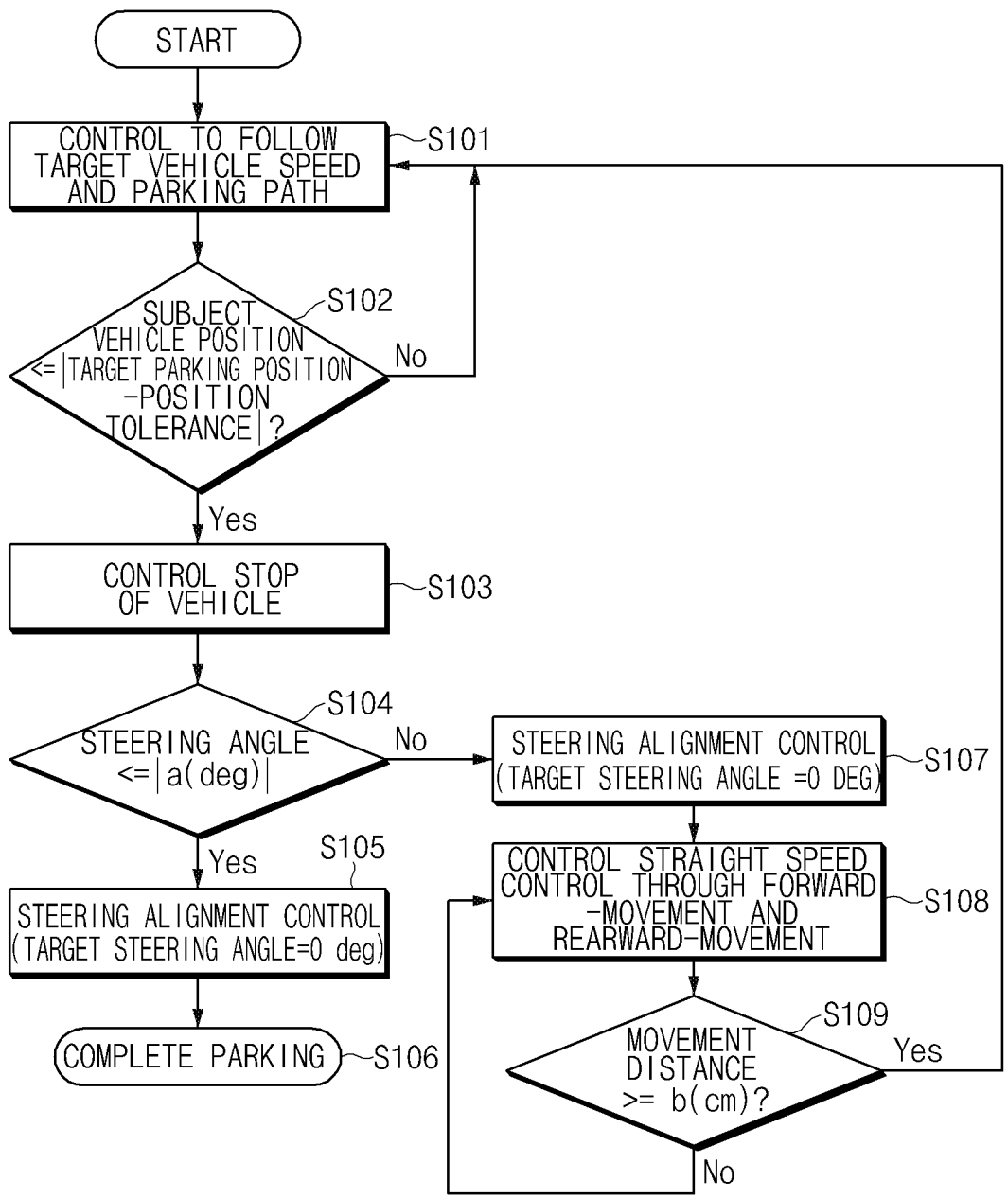
FIG. 7 is a flowchart illustrating a method for controlling the parking in one form of the present disclosure.

Hereinafter, a method for controlling the parking in some forms of the present disclosure will be described in detail with reference to FIG. 7. FIG. 7 is a flowchart illustrating the method for controlling the parking in some forms of the present disclosure.

Hereinafter, it is assumed that the parking control device 100 of FIG. 3 performs the process of FIG. 7. In addition, it may be understood that the operations described as being performed by the parking control device 100 are controlled by the processor 140 of the parking control device 100 in the following description made with reference to FIG. 7.

Referring to FIG. 7, when entering a parking control mode, the parking control device 100 searches parking spaces for a target parking space, selects the target parking space, and performs a control operation of following a target vehicle speed and a target parking path such that the vehicle is parked in the target parking space (S101). In this case, the parking control device 100 may implement an RSPA function.

The parking control device 100 determines whether the position of the subject vehicle is equal to or less than a value obtained by subtracting a position tolerance from the target parking position (S102). When the position of the subject vehicle is equal to or less than the value obtained by subtracting the position tolerance from the target parking position, the parking control device 100 controls the stop of the vehicle (S103).

Thereafter, the parking control device 100 determines whether the steering angle is equal to or less than a preset threshold angle (a deg) (S104). When the steering angle is equal to or less than the preset threshold angle, the parking control device 100 performs the steering angle alignment control (S105). In this case, the target steering angle may be 0 deg. The threshold angle is a steering angle that does not cause a torsion torque and may be experimentally set, in which the torsion torque is generated between the road surface and the steering wheel when the tire is turned back at a specific angle or more using the steering wheel and then aligned to the center.

When the steering angle alignment control is completed, the parking control device 100 completes the parking (S106).

Meanwhile, when the steering angle is greater than a preset specific threshold value in S104, the steering angle alignment control is performed (S107). Then, straight speed control is performed through forward-movement and rearward-movement (S108). In this case, the target steering angle 0 deg.

The parking control device 100 may determine whether the movement distance is equal to or greater than the threshold distance (b cm) (S109) after the steering angle alignment control is performed. When the movement distance is equal to or greater than the threshold distance after the steering angle alignment, the parking control device 100 determines the steering angle alignment as being maintained, determine whether the subject vehicle arrives at the target parking position, and then terminate the parking control. In this case, the threshold distance, which is a distance to maintain the steering wheel alignment, may be experimentally set in advance.

As described above, according to the present disclosure, when the steering angle of the vehicle is equal to or greater than the threshold angle after the vehicle arrives in the target parking space, the forward-movement and the rearward-movement are repeated in the steering center alignment control state until the vehicle arrives at the target parking position beyond the threshold distance. Accordingly, since the vehicle moves in the state that the steering of the vehicle is aligned, the steering angle alignment state is maintained when the steering control is completed and then released.

Figure 8:
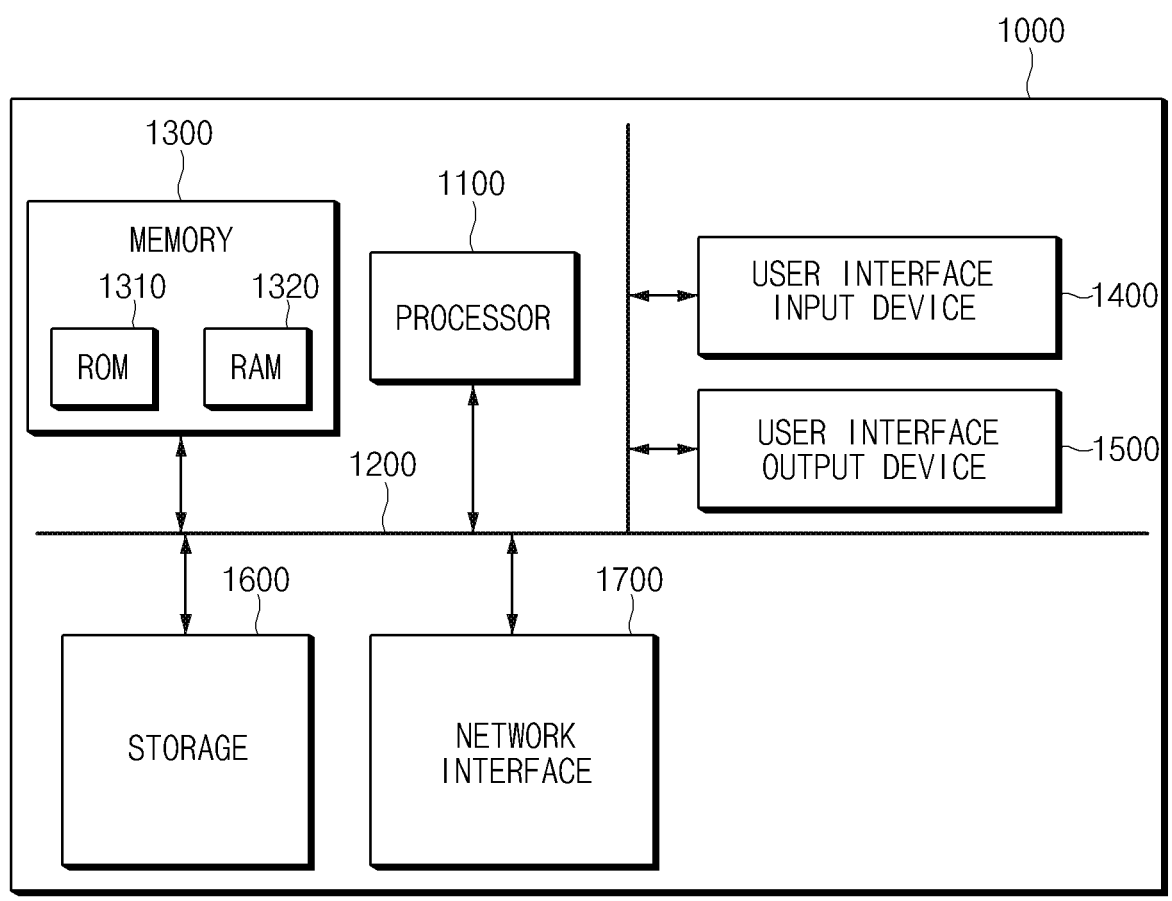
FIG. 8 illustrates a computing system in one form of the present disclosure.

FIG. 8 illustrates a computing system, in some forms of the present disclosure.

Referring to FIG. 8, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in some forms of the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to an aspect of the present disclosure, the tire and the steering angle may be prevented from being misaligned due to the reaction of a road surface, so the completion degree of the automatic parking control is increased, thereby increasing the productivity.

In addition, after parking, the tire and the steering wheel are aligned at the center when the user gets on the vehicle, thereby preventing the vehicle from departing in an unintentional direction.

Besides, a variety of effects directly or indirectly understood through the disclosure may be provided.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for controlling parking of a vehicle, the apparatus comprising:
   a processor configured to:
      stop the vehicle when the vehicle arrives at a target parking space while performing an automatic parking of the vehicle to the target parking space;
      adjust a steering angle; and
      terminate the automatic parking after moving the vehicle for a predetermined distance when the steering angle is adjusted and the steering angle is greater than a preset threshold angle; and
   a storage to store a parking path and the preset threshold angle,
   wherein, when the steering angle is greater than the preset threshold angle, the processor is configured to terminate the automatic parking when a movement distance of the vehicle is equal to or greater than a preset threshold distance after repeatedly moving the vehicle forward or backward.

2. The apparatus of claim 1, wherein the processor is configured to:
   search for at least one parking space when entering an automatic parking mode;
   select, as the target parking space, at least one parking space; and
   control the vehicle to follow the parking path at a target vehicle speed such that the vehicle is parked in the target parking space.

3. The apparatus of claim 1, wherein the processor is configured to:
   terminate the automatic parking after adjusting the steering angle when the steering angle is equal to or less than the preset threshold angle.

4. The apparatus of claim 1, wherein the processor is configured to:
   determine that the vehicle arrives at the target parking space when the vehicle is positioned within a range that is obtained by subtracting an allowable position error from a target parking position.

5. A vehicle system comprising:
   a sensor configured to sense at least one parking space;
   a parking controller configured to:
      stop a vehicle when the vehicle arrives at a target parking space while performing an automatic parking of the vehicle to the target parking space;
      adjust a steering angle; and
      terminate the automatic parking after moving the vehicle for a predetermined angle when the steering angle is adjusted and the steering angle is greater than a preset threshold angle,
      wherein, when the steering angle is greater than the preset threshold angle, the processor is configured to terminate the automatic parking when a movement distance of the vehicle is equal to or greater than a preset threshold distance after repeatedly moving the vehicle forward or backward.

6. The vehicle system of claim 5, wherein the parking controller is further configured to:
   search for at least one parking space when entering an automatic parking mode;
   select, as the target parking space, at least one parking space; and
   control the vehicle to follow a parking path at a target vehicle speed such that the vehicle is parked in the target parking space.

7. The vehicle system of claim 5, wherein the parking controller is further configured to:
   terminate the automatic parking after adjusting the steering angle when the steering angle is equal to or less than the preset threshold angle.

8. The vehicle system of claim 5, wherein the parking controller is configured to:
   determine that the vehicle arrives at the target parking space when the vehicle is positioned within a range that is obtained by subtracting an allowable position error from a target parking position.

9. A method for controlling parking of a vehicle, the method comprising:
   stopping, by a processor, the vehicle when the vehicle arrives at a target parking space while performing an automatic parking of the vehicle to the target parking space;
   adjusting, by the processor, a steering angle; and
   terminating, by the processor, the automatic parking after moving the vehicle for a predetermined distance when the steering angle is adjusted and the steering angle is greater than a preset threshold angle,
   wherein, when the steering angle is greater than the preset threshold angle, terminating the automatic parking further comprises terminating, by the processor, the automatic parking when a movement distance of the vehicle is equal to or greater than the preset threshold distance after repeatedly moving the vehicle forward or backward.

10. The method of claim 9, wherein stopping the vehicle further comprises:
   searching for at least one parking space when entering an automatic parking mode;
   selecting, as the target parking space, one of the at least one parking space; and
   controlling the vehicle to follow a parking path at a target vehicle speed such that the vehicle is parked in the target parking space.

11. The method of claim 9, wherein the method further comprises:
   terminating, by the processor, the automatic parking after adjusting the steering angle when the steering angle is equal to or less than the preset threshold angle.

12. The method of claim 9, wherein stopping the vehicle further comprises:
   determining that the vehicle arrives at the target parking space when the vehicle is positioned within a range that is obtained by subtracting an allowable position error from a target parking position.

* * * * *